US009344398B2

(12) United States Patent
Carriere

(10) Patent No.: US 9,344,398 B2
(45) Date of Patent: *May 17, 2016

(54) COMMUNICATING BETWEEN CLIENTS AT SAME LOCATION ACCORDING TO PREDETERMINED NAMING CONVENTION WITH LOCATION-BASED HOSTNAMES

(71) Applicant: Guest Tek Interactive Entertainment Ltd., Calgary (CA)

(72) Inventor: Lindsey M. Carriere, Calgary (CA)

(73) Assignee: Guest Talk Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,747

(22) Filed: Feb. 12, 2015

(65) Prior Publication Data

US 2015/0163194 A1    Jun. 11, 2015

Related U.S. Application Data

(63) Continuation of application No. 14/093,161, filed on Nov. 29, 2013, now Pat. No. 8,972,539, which is a continuation of application No. 12/902,559, filed on Oct. 12, 2010, now Pat. No. 8,645,509.

(51) Int. Cl.
*G06F 15/16* (2006.01)
*H04L 29/12* (2006.01)
*H04L 12/46* (2006.01)

(52) U.S. Cl.
CPC ........ *H04L 61/2015* (2013.01); *H04L 12/4641* (2013.01); *H04L 61/3025* (2013.01);

(Continued)

(58) Field of Classification Search
CPC . H04L 61/3025; H04L 61/6068; H04L 67/18; H04W 4/021
USPC .......... 709/220, 221, 222, 245; 715/733, 735; 370/254
See application file for complete search history.

(56) References Cited

U.S. PATENT DOCUMENTS 6,779,004 B1    8/2004   Zintel
7,313,606 B2   12/2007   Donahue et al.

(Continued)

OTHER PUBLICATIONS

R. Droms, Network Working Group RFC2131 "Dynamic Host Configuration Protocol", Mar. 1997.

(Continued)

*Primary Examiner* — Frantz Jean
(74) *Attorney, Agent, or Firm* — ATMAC Patent Services Ltd.; Andrew T. MacMillan

(57) ABSTRACT

A method of automatic hostname configuration includes receiving a request from a client device. A location detection module may be utilized for determining a location identifier representing a location at which the client device is located. A hostname is formed including at least the location identifier, and a control server assigns the hostname to the client device by sending an acknowledgement including the hostname to the client device. The request and acknowledgement may be communicated using DHCP. Simple network management protocol messages may be sent to one or more switches to query for a MAC address of the client device to determine the source switch and port from which the request originated. The switch-port-to-location table may include several ports that map to a same location identifier. The hostname may further be formed by including a device type identifier associated with the client device.

20 Claims, 4 Drawing Sheets

(52) U.S. Cl.
CPC .......... *H04L61/609* (2013.01); *H04L 61/1511* (2013.01); *H04L 61/2076* (2013.01); *H04L 61/6068* (2013.01)

(56) References Cited

U.S. PATENT DOCUMENTS

| | | | |
|---|---|---|---|
| 7,853,708 | B2 | 12/2010 | Townsley et al. |
| 8,645,509 | B2 | 2/2014 | Carriere |
| 8,972,539 | B2 | 3/2015 | Carriere |
| 2010/0199188 | A1* | 8/2010 | Abu-Hakima et al. ....... 715/733 |
| 2011/0261834 | A1* | 10/2011 | Krzyzanowski et al. ..... 370/466 |
| 2012/0208496 | A1* | 8/2012 | Raleigh ......................... 455/406 |
| 2012/0290694 | A9* | 11/2012 | Marl et al. .................... 709/223 |

OTHER PUBLICATIONS

S. Alexander, R. Droms, Network Working Group RFC2132 "DHCP Options and BOOTP Vendor Extensions", Mar. 1997.

The Institute of Electrical and Electronics Engineers, Inc., IEEE 802.1Q-2005 "Virtual Bridged Local Area Networks", May 2006.

M. Patrick, Network Working Group RFC3046 "DHCP Relay Agent Information Option", Jan. 2001.

D. Harrington, R. Presuhn, B. Wijnen, Network Working Group RFC3411 "An Architecture for Describing Simple Network Management Protocol (SNMP) Management Frameworks", Dec. 2002.

J. Case, D. Harrington, R. Presuhn, B. Wijnen, Network Working Group RFC3412 "Message Processing and Dispatching for the Simple Network Management Protocol (SNMP)", Dec. 2002.

D. Levi, P. Meyer, B. Stewart, Network Working Group RFC3413 "Simple Network Management Protocol (SNMP) Applications", Dec. 2002.

U. Blumenthal, B. Wijnen, Network Working Group RFC3414 "User-based Security Model (USM) for version 3 of the Simple Network Management Protocol (SNMPv3)", Dec. 2002.

B. Wijnen, R. Presuhn, K. McCloghrie, Network Working Group RFC3415 "View-based Access Control Model (VACM) for the Simple Network Management Protocol (SNMP)", Dec. 2002.

R. Presuhn, Ed., Network Working Group RFC3416 "Version 2 of the Protocol Operations for the Simple Network Management Protocol (SNMP)", Dec. 2002.

R. Presuhn, Ed., Network Working Group RFC3417 "Transport Mappings for the Simple Network Management Protocol (SNMP)", Dec. 2002.

R. Presuhn, Ed., Network Working Group RFC3418 "Management Information Base (MIB) for the Simple Network Management Protocol (SNMP)", Dec. 2002.

* cited by examiner

Switch-port-to-location table 200

| Source switch | Port | Destination switch | Location identifier | Sub-location identifier |
|---|---|---|---|---|
| Switch A | P1 | Switch B | - | - |
| | P2 | Switch F | - | - |
| Switch B | P1 | - | 103 | - |
| | P2 | - | 103 | - |
| | P3 | - | 103 | - |
| | P8 | - | 105 | - |
| | P9 | - | 105 | - |
| Switch F | P1 | - | 115 | LIVING |
| | P2 | - | 115 | LIVING |
| | P3 | - | 115 | LIVING |
| | P6 | - | 115 | BED |
| | P7 | - | 115 | BED |

VLAN-to-location table

| VLAN ID (VID) | Location identifier | Sub-location identifier |
|---|---|---|
| 150 | 103 | - |
| 151 | 105 | - |
| 152 | 115 | LIVING |
| 153 | 115 | BED |

COMMUNICATING BETWEEN CLIENTS AT SAME LOCATION ACCORDING TO PREDETERMINED NAMING CONVENTION WITH LOCATION-BASED HOSTNAMES

CROSS-REFERENCE TO RELATED APPLICATIONS

This application is a continuation of U.S. patent application Ser. No. 14/093,161 filed Nov. 29, 2013 (now U.S. Pat. No. 8,972,539), which is a continuation of U.S. patent application Ser. No. 12/902,559 filed Oct. 12, 2010 (now U.S. Pat. No. 8,645,509). All of these applications are incorporated herein by reference.

BACKGROUND OF THE INVENTION

1. Field of the Invention

The invention pertains generally to network host configuration. More specifically, the invention relates to communicating between clients on a network according to a predetermined naming convention with location-based hostnames.

2. Description of the Related Art

Electronic home controllers allow users to control aspects of their homes such as lights, air conditioners, heaters, fans, curtains, door locks, alarm systems, windows, and other devices using a common user-interface such as their existing television (TV) and TV remote control. A single home control box is installed in the home and integrated with motors, switches and other actuators for various aspects of the home that the user desires to control. The home control box is then configured to establish communication with one or more set-top boxes (STBs) installed in rooms throughout the home. The communication may be established over an internet protocol (IP) network, and, to support this communication, the home control box is configured to connect to a media access control (MAC) address, IP address, and/or hostname of one more STBs in the user's home. Similarly, the various STBs in the user's home may be configured to connect to the MAC address, IP address, and/or hostname of the home control box to establish communications in the other direction. These configuration details are stored in a non-volatile memory of each device. Static IP addresses and/or hostnames are utilized in conjunction with each device's permanent MAC address to stabilize the settings for each device so that configuration is only required once at installation. After this one-time manual configuration of all devices, the home control box can automatically report information to any STB for display on an attached TV and the user can utilize their TV and familiar infrared remote control to perform various home control functions. For example, when starting a movie in a certain room, the curtains in that room may be closed and the lights dimmed without the user needing to leave the sofa.

There is interest to bring such controller technology to the hospitality industry. For example, it would be desirable to provide all the same in-room control options to a guest staying in a hotel room or suite. To take advantage of controller boxes already available for the home market, each guest room and/or suite providing guest accommodations in a hotel or resort may be equipped with its own "home" controller being utilized as a room control box. One or more STBs and the room control box in each room/suite are then manually configured at installation with static configuration information to allow them to communicate with each other over the hotel's IP network. Besides allowing for guest control of in-room aspects, another benefit of allowing electronic control of in-room aspects such as lights, heat, and air-conditioning is to allow the hotel to reduce electricity costs. For example, all electronic devices in a particular room may be automatically shut off by a central control server and heating and air conditioning in the room may be reduced to minimum levels when a guest is not checked-in to the room.

One problem with installing a room control box in each hotel room or suite is how to manage network configuration of the room control boxes and STBs throughout all rooms in the hotel so that the appropriate devices are able to communicate with each other over the hotel's local area network (LAN). For security reasons, it is desirable that a STB in a first guest room not be able to monitor or control aspects of a second (unrelated) guest room; however, it is also inevitable that some devices will malfunction and need to be replaced with a replacement device. Sometimes, it may be desirable that a working device from an unused room be quickly moved to a room experiencing a problem. Requiring each device in a room to be manually programmed with its own static settings and possibly with the static settings related to other devices in the same room places a burden on hotel staff to be able to rapidly and accurately perform such configurations when needed. Device configuration may be difficult for non-technical staff, for example. If a specialist needs to be called each time a malfunctioning device is to be replaced with a new one, guests are negatively impacted by slow response times. Additionally, since different vendors may provide different parts of the hotel's entertainment system, more than one company may be involved in reconfiguration tasks, which further increases delay to guests. For example, replacing or installing a room control box in a particular room may involve configuration of the new room control box itself and also changes to the configuration of one or more STBs in that room and/or a central control server, all of which may be managed by different companies.

Some large hotels and resorts have thousands of guest rooms and suites, each having multiple networked devices such as STBs and room control boxes. Manually maintaining a table of address mappings between devices in each room is not a trivial task, especially when addresses and hostnames of the devices may change at any time due to changes in the network configuration or the devices themselves.

SUMMARY OF THE INVENTION

According to an exemplary embodiment of the invention, there is disclosed a method of communicating between clients on a network according to a predetermined naming convention with location-based hostnames. The network is installed at a facility having a predetermined plurality of separate locations therein. The method includes sending a hostname request by a first client device to a control server via the network. The first client device is located at a location within the facility, and the location is one of the predetermined plurality of separate locations. The method further includes receiving a first hostname at the first client device via the network in response to the hostname request. The first hostname being sent by the control server and including a location identifier representing the location at which the first client device is located within the facility. The method further includes forming a second hostname by the first client device according to the location identifier and the predetermined naming convention. The second hostname corresponding to a second client device at the location. The method further includes sending a domain name system (DNS) request by the first client to a DNS server via the network to resolve an internet protocol (IP) address associated with the second hostname specified in the request, and receiving, by the first client device, the IP address associated with the second hostname from the DNS server in response to the DNS request. The method further includes establishing communications by the first client device with the second client device according to the IP address associated with the second hostname as received at the first client device in response to the DNS request.

According to another exemplary embodiment of the invention, there is disclosed a device including a network interface coupled to a network and one or more processors coupled to the network interface. The network is installed at a facility having a predetermined plurality of separate locations available therein, the device is located at a location within the facility, and the location is one of the predetermined plurality of separate locations. The one or more processors are operable to send a hostname request to a control server via the network, and receive a first hostname via the network in response to the hostname request. The first hostname is sent by the control server and includes a location identifier representing the location at which the device is located within the facility. The one or more processors are further operable to form a second hostname according to the location identifier and a predetermined naming convention. The second hostname corresponding to a second device at the location. The one or more processors are further operable to send a domain name system (DNS) request to a DNS server via the network to resolve an internet protocol (IP) address associated with the second hostname, and receive the IP address associated with the second hostname from the DNS server in response to the DNS request. The one or more processors are operable to establish communications with the second device via the network according to the IP address associated with the second hostname as received in response to the DNS request.

These and other embodiments and advantages of the present invention will become apparent from the following detailed description, taken in conjunction with the accompanying drawings, illustrating by way of example the principles of the invention.

BRIEF DESCRIPTION OF THE FIGURES

FIG. 2 illustrates an exemplary switch-port-to-location table that may be utilized as the location ID table of FIG. 1.

FIG. 3 illustrates an exemplary VLAN-to-location table that may be utilized as the location ID table of FIG. 1.

DETAILED DESCRIPTION

Figure 1:
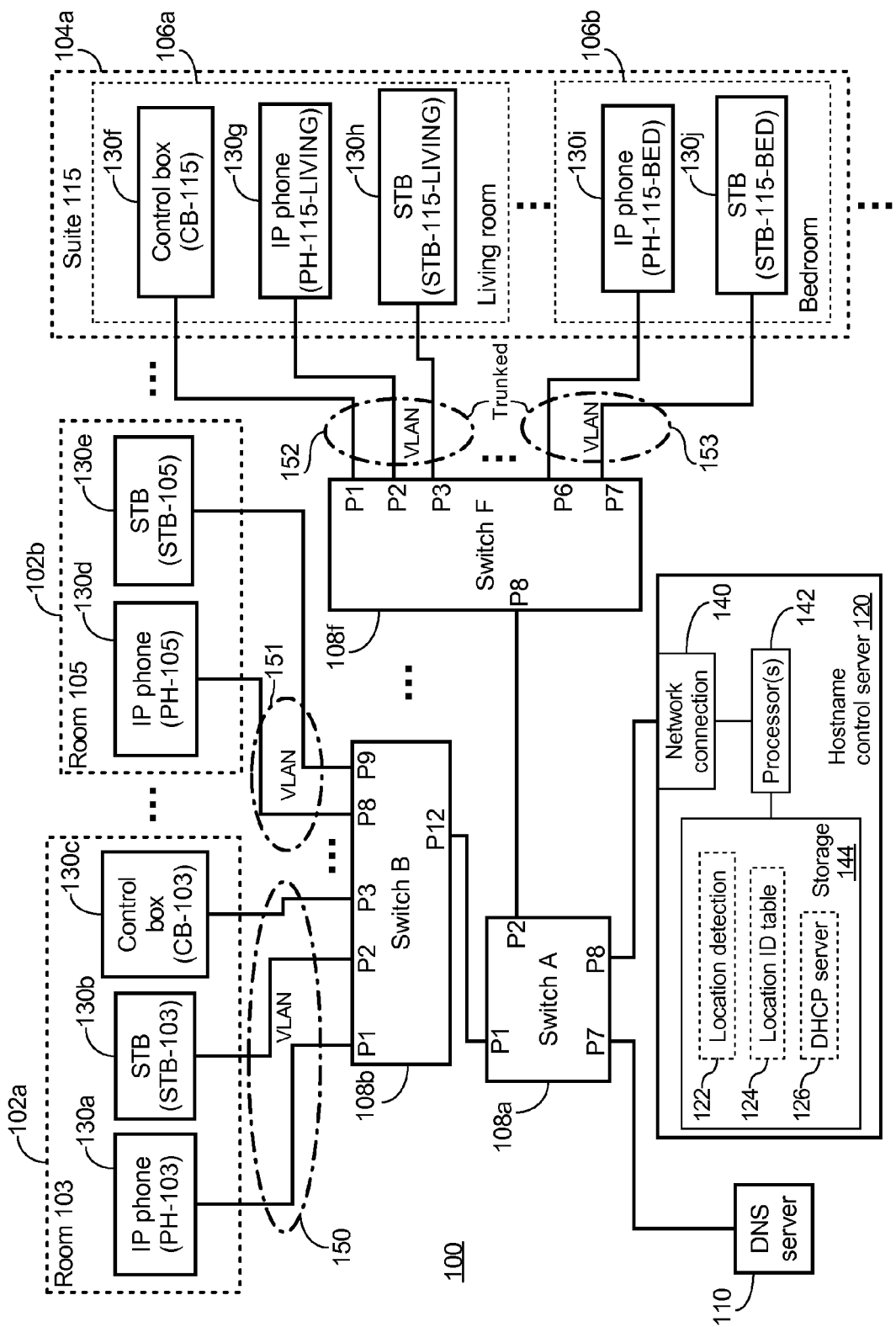
FIG. 1 illustrates a block diagram of a system for performing automatic location-dependent hostname configuration according to an exemplary configuration of the present invention.

FIG. 1 illustrates a block diagram of a system 100 for performing automatic location-dependent hostname configuration according to an exemplary configuration of the present invention. Although the invention is not limited to use at a hotel, for illustration purposes, the system 100 is shown installed in a hotel having a plurality of guest rooms 102 and suites 104, and includes a plurality of networked client devices 130 distributed throughout the rooms 102 and suites 104. In the following, the term "suite" denotes a class of accommodations having a feature of multiple rooms 106 available to the guest. For example, the suite 104a shown in FIG. 1 includes a living room 106a and a bedroom 106b. A plurality of network switches 108 couple each of the client devices 130 to a domain name system (DNS) server 110 and a hostname control server 120. The hostname control server 120 may include a network connection 140 coupled to one or more processor(s) 142, a storage medium 144, a location detection module 122, a location ID table 124, and a dynamic host configuration protocol (DHCP) server module 126. Although only IP phones, STBs, and room control boxes are shown as client devices 130, this is for illustration purposes only and the invention is also equally applicable to other types of client devices 130.

In this configuration, logical network hostnames, shown in brackets in FIG. 1, for each client device 130 are automatically and dynamically assigned to each client device 130 by the hostname control server 120 according to device type, location information, and sub-location information. Three identifiers: [DEVICE_TYPE_ID], [LOCATION_ID], and [SUB-LOCATION_ID] representing these three pieces of information are concatenated with separating hyphens for readability to form a hostname for each device 130 in the following format:

Hostname=[DEVICE_TYPE_ID]-[LOCATION_ID]-[SUB-LOCATION_ID]

One benefit of using location-dependent hostnames is that no manual configuration changes may be required when a device 130 is moved to a new room. For example, a STB 130*h* in the living room 106a of hotel "Suite 115" 104a is automatically assigned the hostname STB-115-LIVING by the hostname control server 126. Likewise, a control box 130*f* that is installed in any room 106 of "Suite 115" and controls all aspects within the entire suite 104a would be automatically provisioned with the hostname CB-115. Additionally, because the sub-location fields are predefined, CB-115 will automatically be able to find STB-115-LIVING on its own since it simply needs to look to its own hostname to determine the location identifier "115" and then attempt communication with STBs at the same location (i.e., by automatically changing the device type identifier prefix to the predefined STB identifier) and at the various possible predefined sub-locations (i.e., LIVING and BED, in this example). DHCP server 126 and dynamic DNS server 110, both described further below, assign and record the IP addresses for the devices 130. Additionally, in the event the STB 130*h* in the living room 106a malfunctions and is replaced, for example, the person replacing the STB 130*h* only needs to physically plug in a new STB to any Ethernet port in the living room 106a and the correct logical hostname STB-115-LIVING will be automatically assigned to the new device by the hostname control server 120. In this way, the system 100 continues to operate as normal with no other changes being required because the new STB has the same logical hostname as the old STB and the DNS server 110 is updated if the IP address of the new STB is different than the old STB. Because the hostnames are done in a format with a "device type identifier" prefix, the control box 106a automatically knows how to communicate with a STB 130*h* in that same suite 104a or room 106a. For example, control box 106a may simply send message to the appropriate prefix (device type identifier) and suffix (sub-location identifier) while keeping the room/suite number (location identifier) the same. The result is there is no need for the person installing a broken STB to configure a replacement STB, or reconfigure the control box or any other devices in the room or elsewhere in the hotel.

In one configuration, the hostname control server 120 determines the device type identifier according to device type information included in a DHCP request from the client device. For example, the DHCP protocol defined in request for comments RFC2131, entitled "Dynamic Host Configuration Protocol" and incorporated herein by reference, supports including vendor-class-information as one or more options in the DHCP request. Vendor-class-information may include a manufacture name and/or model number of the requesting client device 130 and may be parsed by the control server 120 in order to determine the type of the device 130 and an appropriate device type identifier. As shown in FIG. 1, in this example, IP phones have a device type identifier of "PH", STBs have a device type identifier of "STB" and room control boxes have a device type identifier of "CB". Other or different device type identifiers could also be used in other implementations. In one configuration, the group of possible device type identifiers (i.e., "STB", "PH", and "CB") is predetermined and the vendor-class-information is parsed to choose one of the predetermined device type identifiers for the requesting device 130.

FIG. 2 illustrates an exemplary switch-port-to-location table 200 that may be utilized as the location ID table 124 of FIG. 1. In this configuration, table 200 includes a source switch column 202, a port number column 204, a destination switch column 206, a location identifier column 208, and a sub-location identifier column 210. In other configurations, one or more tables may be utilized including the same, fewer, or more fields than illustrated herein according to other design requirements.

Upon receiving a hostname request, the hostname control server 120 may perform port detection to discover a source switch 108 on the network and a port of the source switch 108 from which the request originated. Taking a DHCP request sent by STB 130*b* as an example, the location detection module 122 traces the source switch back to port P2 of switch B 108*b*. Port detection may be performed by sending simple network management protocol (SNMP) messages (e.g., using SNMPv3 as defined by RFC3411-RFC3418, which are each incorporated herein by reference) from the location detection module 122 to one or more managed switches 108 on the network to query for the MAC address of the requesting client device 130 to determine the source switch and port from which the DHCP request originated. The MAC address of the requesting client device 130 is known to the location detection module 122 because it is included in the DHCP request by the client device 130 as a client hardware address (e.g., "chaddr" field defined in RFC2131).

The hostname control server 120 then determines a location identifier by looking up the source switch and port in the switch-port-to-location table 200. For example, port P2 of source switch B 108*b* is associated with a location identifier of "103" as shown in the location identifier column 208. In this configuration, "103" represents the guest room 102*a* designated "Room 103" in FIG. 1. Switch ports may also be associated with a sub-location identifier specified in the sub-location identifier column 210 of the switch-port-to-location table 200. In this example, port P2 of source switch B 108*b* is not associated with a sub-location identifier because "Room 103" is a single guest room (not a multi-room suite). Performing port detection using SNMP messages to query the switches is beneficial in that it helps prevent spoofing of location information that might be included in a DHCP request from a malicious or otherwise un-trusted device 130.

Continuing the above example, after determining the hostname to be "STB-103", the DHCP module 126 sends a DHCP acknowledgement message assigning the new hostname "STB-103" to the requesting STB 130*b*. Additionally, the hostname control server 120 registers the hostname "STB-103" and the STB's IP address (which may also be assigned by the DHCP server 126 in the same DHCP acknowledgement message) with the DNS server 110.

In the event the hostname "STB-103" is already registered on the DNS server 110 with a different IP address, the control server 120 automatically updates the IP address associated with the hostname "STB-103" on DNS server 110 to match the currently utilized IP address of the STB 130*b*. The DNS server 110 may allow dynamic DNS so the IP addresses for a host can be changed at any time, such as might occur when a faulty device is replaced with a working device in a particular room 102, 106, the DHCP server is replaced, the DHCP lease(s) expire, or the DHCP assignments are overwritten for some or all devices 130. In this configuration, the IP address associated with the hostname on the DNS server 110 is updated by the hostname control server 120 so dynamic DNS functionality is not required by the client devices 130.

By automatically assigning a hostname based at least in part on the location and device type of the client device 130, no address or hostname configuration of STB 103*b* needs to be performed by an installer. Because all client devices 103 are dynamically assigned hostnames using a same naming convention such as the one described above, client devices 130 do not need to be preconfigured with the addresses or hostnames of any other devices 103 installed in the same room 102, 106. For example, if IP phone 130*a* needs to establish communication with the STB 130*b* in the same room 102*a* (i.e., "Room 103"), IP phone 130*a* simply replaces the device-type prefix "PH" from its own hostname with the prefix "STB" used for STBs in order to automatically obtain the hostname for STB 130*b* in the same room 102*a* (i.e., "Room 103"). This may be beneficial when IP phone 130*a* requires the IP address of STB 130*b* in order to display a visual indication on a TV installed in the room 102*a* when the phone is ringing, for example. Additionally, because hostnames are dynamically assigned by the hostname control server 120 according to the location of the requesting device 130, a malfunctioning device 103 may simply be replaced with a working device 130 taken from another room 102 and no configuration changes are required to either the newly installed device 130 or any of the devices 130 already present in the room or elsewhere in the hotel. For example, an IP phone 130*a* moved from "Room 103" to "Room 105" will automatically get assigned a location-dependent hostname, "PH-105" in this example, and will therefore ring when someone calls the second room 102*b*. This greatly simplifies both new installations and troubleshooting by non-technical support staff because devices 130 can be moved and plugged in to any available Ethernet port or other type of network connection in a new room 102, 106 and used right away without manually reconfiguring technical settings related to moving the device 130 to the new location.

FIG. 3 illustrates an exemplary VLAN-to-location table that may be utilized as the location ID table of FIG. 1. Included are a VLAN ID (VID) column 302, a location identifier column 304, and a sub-location identifier column 306. In one configuration, the network switch 108 ports for each location and sub-location may be isolated in their own virtual LAN (VLAN), such as by utilizing VLAN Tagging defined by IEEE 802.1Q. For example, as shown in FIG. 1, guest rooms 102 and suite rooms 106 are respectively associated with their own VLANs 150, 151, 152, 153, with the VLANs 152, 153 for the rooms 106 of a suite 104 being trunked (i.e., joined) together to allow the devices 130 in these rooms to communicate with each other.

One benefit of utilizing VLANs in this manner is to separate network traffic from different rooms 102 and suites 104 by preventing devices in one room 102 or suite 104 from accessing devices in other rooms 102 and suites 104. This increases security to ensure that a guest cannot control, monitor or access devices 130 in another guest's room. Another benefit of associating different locations (and sub-locations if applicable) with their own VLANs is the location detection module 122 may utilize the VLAN tags included with an incoming request for a hostname to determine from which room 102 or suite 104 a requesting device 130 is located. For example, switch A 108a may be configured to not strip the VLAN tag field for frames sent from port P8 to the hostname control server 120. Upon receiving a hostname request, the hostname control server 120 may examine the VLAN tag to determine from which VLAN 150, 151, 152, 153 the requested originated. Taking a DHCP request sent by STB 130h in the living room 106a of "Suite 115" as an example, the location detection module 122 may extract the VLAN tag number "152" included in the Ethernet frame(s) forming the DHCP request. The VLAN tag number "152" is then looked up in the VLAN-to-location table 300 to thereby determine the location identifier "115" corresponding to "Suite 115" and sub-location identifier "LIVING" corresponding to the living room 106a of "Suite 115".

It should also be noted that utilizing the DHCP protocol to make the hostname request and send the acknowledgement with the assigned hostname is not a requirement of the present invention. In other configurations, a DHCP-like protocol, custom built protocol, modified DHCP protocol, and/or a proprietary protocol may be used, for example.

Although a client device 130 obtaining its network hostname and IP address at the same time is efficient because it may allow transferring all network configuration using only a single request and response, a client device 130 may also perform one or more requests to obtain all configuration information. In one example, a client device 130 may utilize standard DHCP to first obtain an IP address and then request its hostname from the hostname control server 120 using another communication protocol other than passing information in DHCPREQUEST and DHCPACK. Either the client device 130 or the control server 120 may then register the client device's hostname and IP address with the DNS server 110. Alternatively, in another example, a proprietary protocol may be utilized by the client device 130 to first request a hostname from the hostname control server 120 and then to utilize standard DHCP to request an IP address. Either the client device 130 or the DHCP server may then register the client device's hostname and IP address with the DNS server 110. Other implementations and orders of obtaining the various configuration settings such as hostnames and IP addresses may also be used such as using DHCP to request an IP address and hostname from different DHCP servers.

After obtaining a location-based hostname, a device 130 may request additional configuration information from one or more servers. For example, a newly installed IP phone 130a may obtain a location-dependent hostname "PH-103" from the hostname control server 120. Afterwards, it may request other configuration details associated with the location ID (and/or sub-location ID) from an IP phone managing server (not shown). Examples of other location-dependent configuration details for an IP phone may include ring type, ring volume, answering machine settings, phone and extension numbers, and pre-programmed phone book information. In this way, a replacement IP phone 130a may be automatically configured with all the settings appropriate for the location. A similar procedure may also be used by other types of devices 130 to request location-dependent parameters after obtaining a location-dependent hostname.

Figure 4:
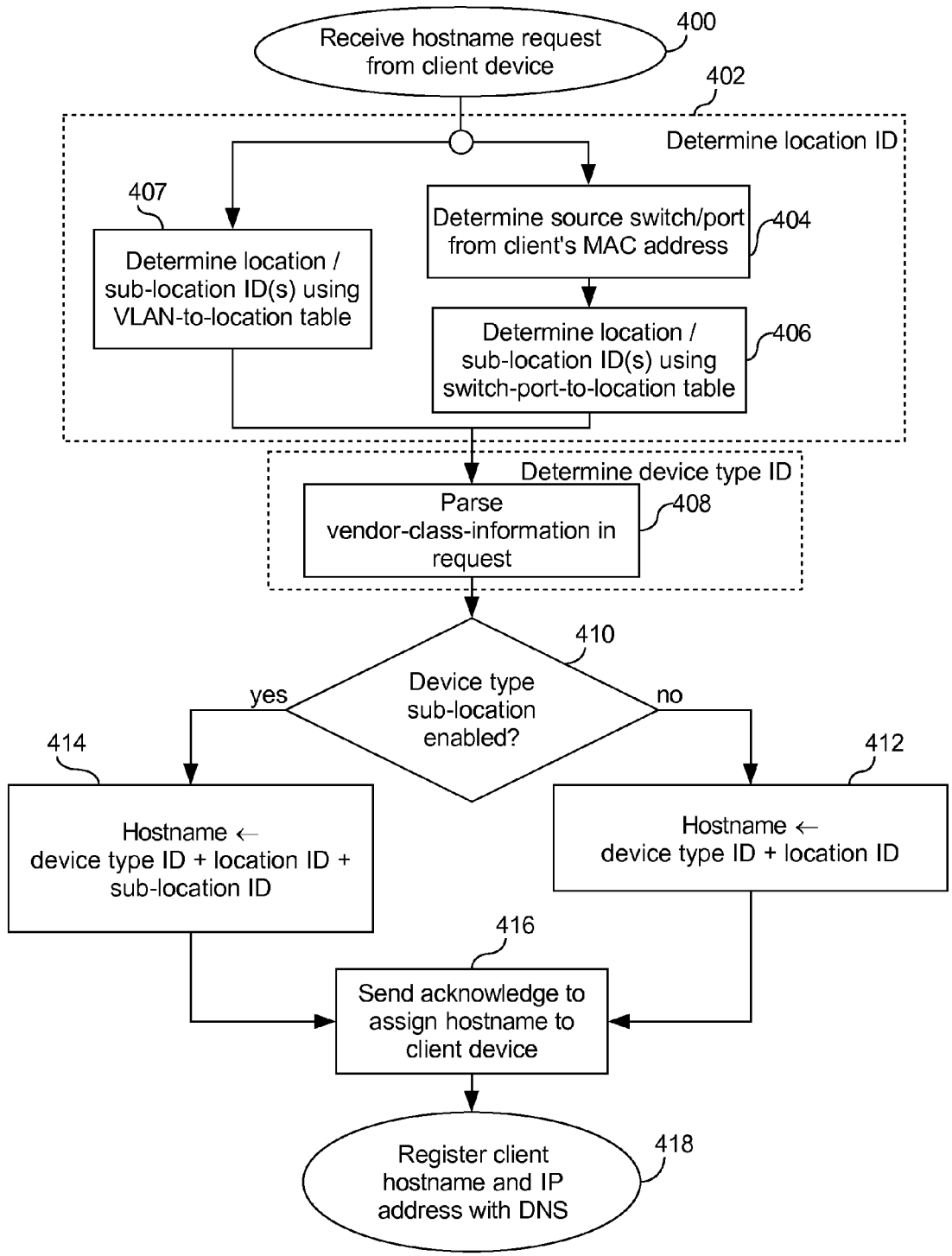
FIG. 4 shows a flowchart describing operational steps performed by the hostname control server of FIG. 1 when automatically assigning a location-dependent hostname to a client over a network according to an exemplary configuration of the present invention.

FIG. 4 shows a flowchart describing operational steps performed by the hostname control server 120 when automatically assigning a location-dependent hostname to a client over a network according to an exemplary configuration of the present invention. The steps of the flowchart are not restricted to the exact order shown, and, in other configurations, shown steps may be omitted or other intermediate steps added. In this configuration, the hostname control server 120 performs the following operations:

Step 400: A hostname request from a client device 130 is received by the hostname control server 120. In one example, the hostname request may be a DHCP request (DHCPREQUEST) including a MAC address and vendor-class-information of the client device 130, and a parameter request list including a request for a hostname (i.e., DHCP host name option code 12 specified in RFC2132, entitled "DHCP Options and BOOTP Vendor Extensions" and incorporated herein by reference) and any other parameters required by the client device 130. The vendor-class-information may include a manufacturer name, model number, serial number, and/or other device type information of the client device 130. For illustration purposes, the remaining explanation will assume the hostname request is a DHCP request; however, other types of hostname requests may also be used with the present invention such as a proprietary hostname request, for example.

Step 402: In this step, the hostname control server 120 determines a location identifier and a sub-location identifier (if applicable) representing the location at which the client device 130 is located.

In some configurations, the information utilized to determine the location identifier is the MAC address of the client device 130 included in the DHCP request. Further details of one such configuration are provided below in steps 404 and 406. In other configurations, the VLAN Identifier (VID) of the VLAN tag field of frames forming the DHCP request is utilized. Further details of one such configuration are provided below in step 407. In yet other configurations, the DHCP request may include location information that is automatically detected by the client device 130 and then passed to the hostname control server 120 as a part of the DHCP request. This may be particularly beneficial when the client device 130 is accessing a wireless network accessible from one or more locations. Examples of information that may be passed by the client device 130 to the hostname control server 120 include a service set identifier (SSID) of a detected wireless access point, a global position system (GPS) location, radio frequency identification (RFID) tags detected in the location, or global system for mobile communications (GSM) tower identifier and signal strength information.

Alternatively, the client device 130 may be pre-programmed to query a location detection service such as location detection module 120 before performing the DHCP request in order to first detect or obtain the location identifier and then pass it to the hostname control server 120. For example, the client device 130 may pass location information to the hostname control server 120 as a requested hostname in the DHCPREQUEST.

In yet another configuration, one or more devices in the network path such as the switches 108 themselves may include location information into the DHCPREQUEST when they pass the request upstream to the hostname control server 120. For example, RFC3046, entitled "DHCP Relay Agent Information Option" and incorporated herein by reference, describes how a switch 108 may add relay agent information to DHCPREQUEST such as the port and switch from which a DHCP request originated.

In some configurations, the location identifier may represent a network location at which the client device 130 is located such as a source switch and port designator. In other configurations, such as the examples shown in FIG. 1, FIG. 2, and FIG. 3, the location identifier may represent a physical location at which the client device is located such as the room 102 or suite 104 in which the client device 130 is being used. Since there may be more than one network connection or port available in a single location, as shown in FIG. 2, the switch-port-to-location table 200 may include a plurality of switch ports that map to a same location identifier and/or a same sub-location identifier. Likewise, since a single location (e.g., suite 104) may include one or more sub-locations (e.g., rooms 106), the VLAN-to-location table 300 may include a plurality of VIDs that map to a same location identifier and/or a same sub-location identifier.

In general, according to information included in or associated with the DHCPREQUEST, the hostname control server 120 determines the location identifier and any sub-location identifier, and control proceeds to step 408. Please see steps 404 and 406 for more information on how the MAC address of the client device 130 may be used by the hostname control server 120 to automatically determine the location and sub-location identifiers. Please see step 407 for more information on how VLAN identifiers (VIDs) associated with the hostname request may be used for similar purposes.

Step 404: Although, as described at step 402, it is possible to provide client devices 130 or switches 108 capable of determining the location of the client device 130 and then passing this information to the hostname control server 120 in the DHCPREQUEST, there are some security concerns that this information could be invalid if it is "spoofed" by a malicious device 130 such as an unauthorized device 130 carried into the hotel by a guest. Since it is highly undesirable that an unauthorized device 130 could control or monitor aspects of a different guest's room 102 or suite 104, in one configuration, these capabilities of client devices 130 and switches 108 are not utilized. Instead, the client devices 130 simply include their MAC address in a client hardware address "chaddr" field of the DHCPREQUEST, as is common behaviour for a host using DHCP to request an IP address. With reference to FIG. 1, the location detection module 122 then sends a SNMP message to "Switch A" 108*a* to query on which port the switch 108*a* received a packet from the specified MAC address. Switch-port-to-location table 200 is utilized to determine a next destination switch 206 for the detected port. The process repeats by sending an SNMP message to the next switch until the source switch and port from which the DHCPREQUEST was originally received is determined.

In this way, even if a malicious client device 130 spoofs a current MAC address of a device 130 in another guest's room, the hostname control server 120 will discover the spoofing attempt because there will be two originating switches/ports that map to different location identifiers 208 in the switch-port-to-location table 200. In this situation, the DHCP request may be ignored and a security alert may be sent to an administrator by the hostname control server 120 including details such as the two conflicting locations.

Step 406: The location detection module 122 looks up the source switch and port and examines the corresponding location identifier column 208 and sub-location identifier column 210 in the switch-port-to-location table to respectively determine the location identifier and, if applicable, the sub-location identifier associated with the location of the requesting client device 130.

Step 407: VLANs may be used to increase network security and to allow automatic location detection. In these configurations, the originating network switch 108 inserts a VLAN tag field including a VID into frames transmitted by an originating device 130 such as the frames forming the hostname request (DHCPREQUEST). Rather than stripping the VLAN tag field off the frames, "Switch A" 108*a* may be configured to pass this information to a VLAN enabled hostname control server 120. The location detection module 122 may thereby determine the location and sub-location identifiers (if applicable) using the VLAN-to-location table 300 to look up the VID, for example.

Step 408: The hostname control server 120 parses the vendor-class-information to determine the device type identifier for the requesting client device 130. Different manufacturer names may be associated with different types of devices. For example, if the vendor-class-information includes the phrase "ENSEO", the device identifier may be determined to be "STB" because the company Enseo is a STB manufacturer. For manufactures that produce multiple types of devices, model numbers and serial numbers included in the vendor-class-information may be parsed by the hostname control server 120 to determine the device type identifier.

Step 410: In this example, control boxes (hostnames starting with device type identifier "CB" in FIG. 1) are not sub-location enabled devices. As shown in FIG. 1, the control box 130*f* in the living room 106*a* of suite 104*a* does not include the sub-location identifier suffix "LIVING", even though switch-port-to-location table 200 indicates "Switch F", port P1 is associated with sub-location identifier "LIVING".

The reason why control boxes are not sub-location enabled in this configuration is that only one control box 130*f* is installed for the whole suite 104*a* and controls aspects of each of the rooms 106 in the suite 104*a*. Conversely, in this example, device type identifiers "STB" and "PH" are sub-location enabled and may be listed on a sub-location enabled device list because phones and STBs may operate in a room-dependent manner within a suite 104 and each room 106 in a suite 104 may have one or more of these device types. For example, a user may transfer a call from the IP phone 130*g* in the living room 106*a* to the IP phone 130*i* in the bedroom 106*a*, or the STB 130*h* may be coupled to a TV in the living room while the STB 130*j* is coupled to a TV in the bedroom 106*b*, for example. When the device type identifier determined in step 408 is listed on the sub-location enabled device list, control proceeds to step 414; otherwise, control proceeds to step 412.

Step 412: Because the device type is not sub-location enabled (e.g., device type identifier "CB" in this example), the hostname is formed by concatenating the device type identifier with the location identifier (separated by a hyphen in this configuration for increased readability by human network administrators and to make parsing and substitution easier for the client devices 130). Any sub-location identifier associated the requesting device 130 is ignored in this step because only one of the device type will be installed is this location (i.e., guest room 102 or suite 104).

Step 414: Because the device type is sub-location enabled (e.g., device type identifiers "STB" and "PH" in this example), the hostname is formed by concatenating the device type identifier with the location identifier and the sub-location identifier (if present).

Step 416: The DHCP server 126 assigns the hostname formed in either step 412 or 414 to the client device 130 by sending a DHCP acknowledgement including the hostname to the client device 130. For example, the new hostname may be passed using DHCP host name option code 12 specified in RFC2132. Other configuration settings may also be assigned at the same time such as an IP address, default gateway, DNS servers, net mask, etc. The values of these parameters may be dynamically chosen by the control server 120 according to the location identifier, device type identifier, and/or sub-location identifier associated with the client device 130. Other location identifiers may also be utilized. For example, in a multi-story building, different floors may utilize different default gateways such as a different router installed on each floor. Therefore, when a client device 130 is moved from one floor to another floor, it may be automatically reconfigured by the control server 120 with the proper default gateway for that floor. In configurations where the hostname request is not a DHCP request, the acknowledgement sent by the hostname control server 120 may also be another type of acknowledgement or response message other than a DHCPACK.

Step 418: Dynamic DNS techniques may be utilized to register (or update) the hostname and the IP address of the client device 130 with the DNS server 110. In one configuration, if the hostname doesn't exist on the DNS server 110, the DHCP server 126 adds it when it assigns the IP and hostname. It also updates the DNS record if the IP changes. The end result is all devices obtain their own logical hostnames at boot up because they are dynamically assigned by the hostname control server 120. In this way, any client device 130 in a particular room 102, 106 can communicate with other devices 130 in the same room 102, 106 or suite 104 by sending messages to the other devices' hostnames. The other devices hostnames may be determined by substituting different device type identifiers and/or sub-location identifiers as prefixes and suffixes while keeping the location identifier the same according to the sending client device's own hostname.

Automatic provisioning of the logical hostnames of devices 130 in the various hotel rooms 102, 106 is performed directly by the hostname control server 120 according to at least the location of the requesting device 130. This eliminates the manual configuration of hostnames by support staff when a new device 130 installed and when a device 130 is moved to a new room 102 or suite 104. Instead of manual configuration, when establishing network connectivity or when the DHCP lease times expire, each device queries DHCP for an IP address and also reports its type but that it has no hostname. The DHCP server 126 detects the requesting devices location and assigns both an IP address and a location-dependent hostname for the new device. In one configuration, the hostname is determined according to the reported device type and the room detection algorithm (for example, switch/port detection). Sub-locations within a larger location may be determined in the same way such as rooms within suite, for example. Other location-dependent and device-type-dependent configuration parameters may be passed in the same way or automatically configured according to the assigned hostname.

Although performing room/location detection using network switch port mapping requires a table 124 of the network switches/ports to rooms to be maintained on the control server 120, it is possible port-mapping information is already present within a hotel environment for providing other room detection functions and features built into the hotel's media or entertainment system. For example, a similar network switch/port mapping may be present to automatically bill Internet access for a user's laptop to the correct hotel room 102 or suite 104. Therefore, existing port mapping information may be advantageously reused or enhanced to provide the switch-port-to-location information 200 with the addition of the sub-location identifier column 210 if sub-location functionality is desired.

In one configuration, DHCP and dynamic DNS are utilized to assign specific location-based hostnames and IP addresses to the devices 130 to allow them to communicate on the network, and because the devices use logical hostnames to communicate, the actual IP addresses may be changed at any time by the media system as required. Also, by automatically following naming conventions for the logical hostnames chosen according to device types, locations, and sub-locations, the need to manually configure the new device or reconfigure other devices during installation is eliminated. This is particularly advantageous in a hospitality location such as a hotel that may not have sufficient technical support staff on hand to perform reconfigurations and where different vendors may manage different devices included in the hotel's media system. The exact hostname naming convention may be manipulated on a site by site basis to comply with any existing client network standards already established, e.g., to comply with the naming conventions required by Marriott Corporation's Clear-Sky Network (CSN).

In summary, a method of automatic hostname configuration includes receiving a request from a client device. A location detection module may be utilized for determining a location identifier representing a location at which the client device is located. A hostname is formed including at least the location identifier, and a control server assigns the hostname to the client device by sending an acknowledgement including the hostname to the client device. The request and acknowledgement may be communicated using DHCP. Simple network management protocol messages may be sent to one or more switches to query for a MAC address of the client device to determine the source switch and port from which the request originated. A switch-port-to-location table may include several ports that map to a same location identifier. The hostname may further be formed by including a device type identifier associated with the client device.

Although the invention has been described in connection with a preferred embodiment, it should be understood that various modifications, additions and alterations may be made to the invention by one skilled in the art without departing from the spirit and scope of the invention. For example, although the description of the invention has focused on a hotel having a plurality of single guest rooms 102 and multi-room suites 104, the invention is equally applicable to assigning location-dependent hostnames to client devices distributed throughout any type of networked facility including but not limited to hotels, motels, resorts, hospitals, apartment/townhouse complexes, restaurants, retirement centres, cruise ships, busses, airlines, shopping centres, passenger trains, personal homes, cities, etc. In example use case, location-dependent hostnames may be assigned based on different floors of a building with sub-locations being rooms on each floor. Alternatively, the locations may correspond to departments in a company and the sub-locations to employee desks within each department. Locations may be any group of sub-locations. Additionally, it is also possible to further partition the sub-locations into one or more sub-sub-locations and dynamically assign corresponding hostnames using the same techniques. VLANs and port mapping techniques may be used together or individually in different configurations. Examples of client devices 130 include Internet browsing devices, set-top boxes, mobile phones, laptop computers, notebook computers, desktop computers, tablet computers, personal digital assistants (PDAs), digital televisions, routers, electronic billboards, data storage devices, alarm devices, IP phones, projectors, and any other networked device. Location-dependent hostnames may also be assigned as location-dependent domain names (e.g., fully qualified domain names).

The above description describes elements of system 100 for automatic hostname configuration that may include one or more modules, some of which are explicitly shown in the figures, others that are not. As used herein, the term "module" may be understood to refer to computing software, firmware, hardware, and/or various combinations thereof. It is noted that the modules are exemplary. For example, one or more processors 142 may operate pursuant to instructions stored on a machine readable storage medium 144 to provide the functions as described for the modules. The modules may also be combined, integrated, separated, and/or duplicated to support various applications. Also, a function described herein as being performed at a particular module may be performed at one or more other modules and/or by one or more other devices instead of and/or in addition to the function performed at the particular module. Further, the modules may be implemented across multiple devices and/or other components local or remote to one another. For example, the location detection module 122, the DHCP server 126, and the location ID table 124 shown within the hostname control server 120 in FIG. 1 may each be implemented as a standalone device with its own network connection to "Switch A" 108*a*. Likewise, the DNS server 110 may be integrated within the hostname control server 120. Additionally, modules may be moved from one device and added to another device, and/or may be included in both devices. In addition to a dedicated physical computing device, the word "server" may also mean a service daemon on a single computer, virtual computer, or shared physical computer, for example. All combinations and permutations of the above described features and configurations are within the scope of the invention.

What is claimed is:

1. A method of communicating between clients on a network according to a predetermined naming convention with location-based hostnames, the network installed at a facility having a predetermined plurality of separate locations therein, the method comprising:
    sending a hostname request by a first client device to a control server via the network; wherein the first client device is located at a location within the facility, and the location is one of the predetermined plurality of separate locations;
    receiving a first hostname at the first client device via the network in response to the hostname request, the first hostname being sent by the control server and including a location identifier representing the location at which the first client device is located within the facility;
    forming a second hostname by the first client device according to the location identifier and the predetermined naming convention, the second hostname corresponding to a second client device at the location;
    sending a domain name system (DNS) request by the first client to a DNS server via the network to resolve an internet protocol (IP) address associated with the second hostname specified in the request;
    receiving, by the first client device, the IP address associated with the second hostname from the DNS server in response to the DNS request; and
    establishing communications by the first client device with the second client device according to the IP address associated with the second hostname as received at the first client device in response to the DNS request.

2. The method of claim 1, wherein the hostname request is a dynamic host configuration protocol (DHCP) request.

3. The method of claim 1, further comprising including in the hostname request a media access control (MAC) address of the first client device.

4. The method of claim 1, further comprising changing, by the first client device, portions of the first hostname other than the location identifier to thereby form the second hostname.

5. The method of claim 1, further comprising replacing, by the first client device, a device type identifier in the first hostname with a different device type identifier to thereby form the second hostname.

6. The method of claim 1, wherein the location identifier further comprises a sub-location identifier representing a sub-location within the location at which the first client device is located.

7. The method of claim 6, wherein:
    the location identifier represents a suite in which the first client device is located; and
    the sub-location identifier represents a room in which the first client device is located, the room being within the suite.

8. The method of claim 1, further comprising registering the first hostname and an internet protocol (IP) address of the first client device with the DNS server.

9. The method of claim 1, further comprising updating an IP address associated with the first hostname on the DNS server to match a currently utilized IP address of the first client device.

10. The method of claim 1, wherein:
    the facility is a hospitality establishment; and
    the location identifier represents a guest room of the hospitality establishment in which the first client device is located.

11. A non-transitory computer readable medium comprising computer executable instructions that when executed by a computer server cause the computer server to perform the method of claim 1.

12. A device comprising:
    a network interface coupled to a network; wherein the network is installed at a facility having a predetermined plurality of separate locations available therein, the device is located at a location within the facility, and the location is one of the predetermined plurality of separate locations; and
    one or more processors coupled to the network interface and operable to:
    send a hostname request to a control server via the network;
    receive a first hostname via the network in response to the hostname request, the first hostname being sent by the control server and including a location identifier representing the location at which the device is located within the facility;
    form a second hostname according to the location identifier and a predetermined naming convention, the second hostname corresponding to a second device at the location;
    send a domain name system (DNS) request to a DNS server via the network to resolve an internet protocol (IP) address associated with the second hostname;
    receive the IP address associated with the second hostname from the DNS server in response to the DNS request; and establish communications with the second device via the network according to the IP address associated with the second hostname as received in response to the DNS request.

13. The device of claim 12, wherein the hostname request is a dynamic host configuration protocol (DHCP) request.

14. The device of claim 12, wherein the one or more processors are further operable to include in the hostname request a media access control (MAC) of the device.

15. The device of claim 12, wherein the one or more processors are further operable to change portions of the first hostname other than the location identifier to thereby form the second hostname.

16. The device of claim 12, wherein the one or more processors are further operable to replace a device type identifier in the first hostname with a different device type identifier to thereby form the second hostname.

17. The device of claim 12, wherein the location identifier further comprises a sub-location identifier representing a sub-location within the location at which the device is located.

18. The device of claim 12, wherein the one or more processors are further configured to register the first hostname and an internet protocol (IP) address of the device with the DNS server.

19. The device of claim 12, wherein the one or more processors are further configured to update an IP address associated with the hostname on the DNS server to match a currently utilized IP address of the device.

20. The server of claim 12, wherein:
the facility is a hospitality establishment; and
the location identifier represents a guest room of the hospitality establishment in which the device is located.

* * * * *